US007428484B2

(12) United States Patent
Yun et al.

(10) Patent No.: US 7,428,484 B2
(45) Date of Patent: Sep. 23, 2008

(54) APPARATUS AND METHOD FOR MODELING AND ANALYZING NETWORK SIMULATION FOR NETWORK SIMULATION PACKAGE

(75) Inventors: Sung Hyun Yun, Daejeon (KR); Moon Kyun Oh, Daejeon (KR); Kyung Jun Park, Daejeon (KR); Yong Mun Park, Daejeon (KR); No Ik Park, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 555 days.

(21) Appl. No.: 11/051,667

(22) Filed: Feb. 4, 2005

(65) Prior Publication Data

US 2006/0085178 A1   Apr. 20, 2006

(30) Foreign Application Priority Data

Oct. 18, 2004  (KR) .................... 10-2004-0083203

(51) Int. Cl.
  *G06F 17/50* (2006.01)
  *H04L 12/40* (2006.01)
(52) U.S. Cl. .................... 703/15; 703/27; 713/171
(58) Field of Classification Search ............. 703/2, 703/15, 27; 709/220; 713/171
  See application file for complete search history.

(56) References Cited

U.S. PATENT DOCUMENTS

| 5,487,131 | A  | * | 1/1996 | Kassatly et al. ........... 706/53 |
| 6,188,975 | B1 | * | 2/2001 | Gay ........................ 703/22 |
| 2003/0005090 | A1 | * | 1/2003 | Sullivan et al. ........... 709/220 |
| 2003/0009668 | A1 | * | 1/2003 | Chan et al. ............... 713/171 |
| 2006/0064178 | A1 | * | 3/2006 | Butterfield et al. ....... 700/18 |

FOREIGN PATENT DOCUMENTS

KR   1020030025350 A   3/2003

OTHER PUBLICATIONS

NAMS: Network Automated Modeler and Simulator, pp. 65-70, unknown date.
1999 International Conference on Parallel and Distributed Processing Techniques and Aplications, Jun. 28-Jul. 1, 1999, pp. 1-9.

* cited by examiner

*Primary Examiner*—Thai Phan
(74) *Attorney, Agent, or Firm*—Blakely Sokoloff Taylor & Zafman

(57) ABSTRACT

Provided are an apparatus and method for modeling and analyzing a network simulation for a salable simulation framework (SSF)-based network simulation package. A system logic set is generated and a network simulation modeling suitable for a predetermined network application is formed according to the system logic set. The network simulation modeling is transmitted to a predetermined network simulation package that performs simulation. Statistical information is generated based on the result according to the system logic set. Complicated network simulation modeling errors can be minimized, and remodeling of the network simulation modeling can be reduced.

12 Claims, 4 Drawing Sheets

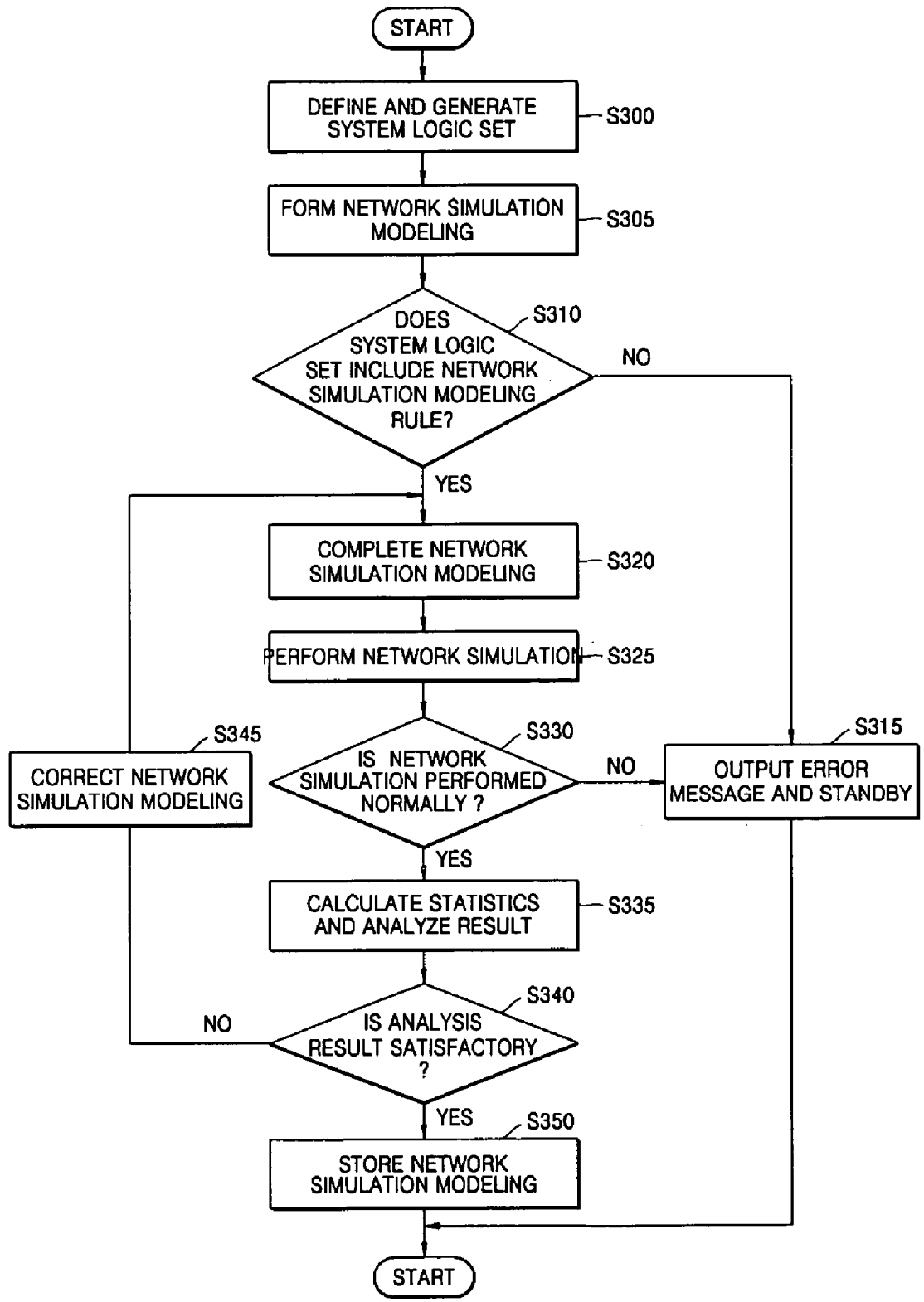

FIG. 4

| | | | |
|---|---|---|---|
| 400 | @ | KEY POSTFIX | DEFINE LOCATION OF DML UNIT, OBJECT DELIMITER |
| 401 | + | KEY PREFIX | DEFINE DML UNIT CAPABLE OF BEING ADDED AND DELETED BY USER |
| 402 | ~ | KEY POSTFIX | DISREGARD DML UNIT FOR PRESENT LEVEL |
| 403 | \| | KEY PREFIX | DEFINE ONE ELEMENT OF DML UNIT SET THAT EXPRESSES SAME LEVEL |
| 404 | : | VALUE DELIMITER | DEFINE SCOPE OF VALUE IN DML UNIT |
| 405 | % | VALUE PREFIX | SYSTEM PARAMETER AUTOMATICALLY PROVIDED WITH VALUE HAVING INITIAL VALUE AND INCREMENT, INITIAL VALUE, AND INCREASING DELIMITER |
| 406 | $ | KEY PREFIX | DEFINE WHETHER TO ALLOW ENABLE/DISABLE OF DML UNIT |
| 407 | < | KEY PREFIX | DEFINE REPETITIVE START OF DML UNIT PATTERN |
| 408 | > | VALUE POSTFIX | DEFINE REPETITIVE END OF DML UNIT PATTERN |
| 409 | - | RESERVED KEYWORD | SYSTEM SUBSTITUTER, _DESTID, _SRCID, _PEERID, _CORENODEIDS, _X, _Y, _OID |
| 410 | * | KEY PREFIX | DEFINE HIDDEN DML UNIT IN GUI |
| 411 | α& | KEY PREFIX | FORMAT RECOGNITION OF VARIOUS WINDOW TYPES TO EXPRESS AND EDIT ATTRIBUTE OF NETWORK OBJECT, INTEGER LITERAL |
| 412 | / | KEY & VALUE DELIMITER | EXPRESS NAME OR UNIT FAMILIAR WITH USER |
| 413 | = | UNIT OPERATOR | PREPARE DML UNIT SUBSTITUTER, DML MAPPING TABLE |
| 414 | ? | UNIT OPERATOR | DEFINE STATISTICS OPERATION EQUATION |

APPARATUS AND METHOD FOR MODELING AND ANALYZING NETWORK SIMULATION FOR NETWORK SIMULATION PACKAGE

BACKGROUND OF THE INVENTION

This application claims the priority of Korean Patent Application No. 10-2004-0083203, filed on Oct. 18, 2004, in the Korean Intellectual Property Office, the disclosure of which is incorporated herein in its entirety by reference.

1. Field of the Invention

The present invention relates to an apparatus and method for modeling and analyzing a network simulation, and more particularly, to an apparatus and method for modeling and analyzing a network simulation for a salable simulation framework (SSF)-based network simulation package.

2. Description of the Related Art

Generally, a network simulation is used to assess the practicability, operability, and other performance of a variety of functions desired by a network, before the network is developed, and inspect vulnerabilities created by the network in order to guarantee the effectiveness of the network. A network simulation modeling capable of properly assessing the network, and simulation analysis means capable of effectively analyzing results obtained through the network simulation, are required to obtain the maximum effect of the network simulation.

A salable simulation framework (SSF) is a kind of network simulation package, and provides a variety of network objects such as a basic network protocol, node, link, etc. In the form of open source.

A SSF-based network simulation package processes the variety of network objects provided by SSF, and provides a network simulation application capable of simulating a specific state in the network. The SSF-based network simulation package is configured as a combination of simulation applications, and the network simulation modeling and simulation analysis vary according to the simulation application. However, although the network simulation modeling varies according to the simulation application, a domain modeling language (DML) is used for every network simulation modeling in the SSF-based network simulation package.

DML is a modeling language that provides easy high-level functions for defining a model, and is particularly suitable for expressing configuration information of a large-scale network such as the Internet. DML's hierarchical structure makes it possible to constitute a plurality of recursive sub networks, and makes it easy to expand.

A network simulation modeling method used in a conventional SSF-based network simulation package defines in advance a variety of network objects having their own intrinsic attributes with respect to a network simulation model, according to the characteristic of a network simulation application, and DML is composed by hand based on the network objects.

However, since the conventional network simulation modeling method must be partly carried out by hand, it is difficult to complete a complicated network simulation modeling without mistakes.

It is especially difficult to easily recognize the scope of the simulation application that guarantees the networking function in defining a variety of network objects capable of being expressed and processed in the conventional SSF-based network simulation package.

The conventional network simulation modeling method is confusing because it does not provide the user with intuitive means of recognition of the existing network simulation modeling. In particular, the user must pay close attention to a large-scale network simulation modeling.

Since the network simulation modeling varies according to the simulation application, it is necessary to correct the existing network simulation modeling by hand for application to a different simulation application, which introduces human error and requires much of time and expense.

It is necessary for all users to calculate various statistics in order to analyze a network simulation result with respect to the existing network simulation modeling. Therefore, a great deal of time and expense are required to obtain various statistical results in order to more exactly assess the network.

SUMMARY OF THE INVENTION

The present invention provides a network simulation modeling, apparatus and method for analyzing a network simulation, capable of automatic network simulation modeling using the characteristics of an SSF-based network simulation package, thereby minimizing human error in network simulation modeling, and providing convenient means for analyzing a network simulation result.

The present invention also provides a network simulation modeling, apparatus and method for analyzing a network simulation, for a general-purpose SSF-based network simulation package that does not belong to a specific network simulation application, by redefining a network object according to the correlation of simulation applications and applying a network simulation modeling to different simulation applications.

According to an aspect of the present invention, there is provided an apparatus for modeling and analyzing a network simulation for a network simulation package, comprising: a system logic generator which generates a system logic set including a network simulation modeling rule and a simulation statistics calculation rule; a model generator which forms the network simulation modeling suitable for a predetermined simulation application according to the network simulation modeling rule of the system logic set; a simulation core interface which transmits the network simulation modeling to a predetermined network simulation package, and receives a result obtained after the network simulation modeling is performed; and a statistics processor which generates statistical information from the result received from the simulation core interface according to the simulation statistics calculation rule of the system logic set.

According to another aspect of the present invention, there is provided a method of modeling and analyzing a network simulation for a network simulation package, comprising: generating a system logic set including a network simulation modeling rule, a network simulation modeling exchange rule, and simulation statistics calculation rule; forming the network simulation modeling suitable for a predetermined simulation application according to the network simulation modeling rule of the system logic; transmitting the network simulation modeling to a predetermined network simulation package, and receiving the result of the network simulation modeling from the predetermined network simulation package; and generating statistical information from the result received from the network simulation package according to the simulation statistics calculation rule of the system logic set.

Complicated network simulation modeling errors can be minimized, and remodeling of network simulation modeling can be reduced.

BRIEF DESCRIPTION OF THE DRAWINGS

The above and other features and advantages of the present invention will become more apparent by describing in detail exemplary embodiments thereof with reference to the attached drawings in which:

FIGS. 3A and 3B are flow charts describing a method of modeling and analyzing a network simulation according to an embodiment of the present invention; and FIG. 4 is a diagram of a system logic set used for an apparatus for modeling and analyzing the network simulation for the SSF-based network simulation package.

DETAILED DESCRIPTION OF THE INVENTION

The present invention will now be described more fully with reference to the accompanying drawings.

Figure 1:
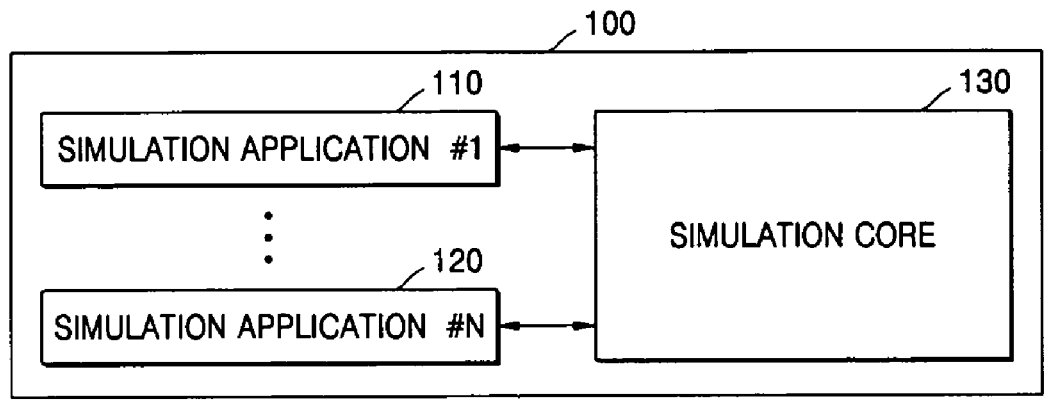
FIG. 1 is a block diagram of a salable simulation framework (SSF)-based network simulation package to which the present invention is applied.

FIG. 1 is a block diagram of a salable simulation framework (SSF)-based network simulation package to which the present invention is applied. Referring to FIG. 1, the SSF-based network simulation package 100 comprises one or more simulation applications 110 and 120, and a simulation core 130.

The simulation core 130 provides a variety of network objects such as a basic network protocol, node, link, etc. Necessary for a network simulation, in the form of open source.

The simulation applications 110 and 120 inherit and process the variety of network objects provided by the simulation core 130, and simulate a specific state in a network. Since a simulation application has its own intrinsic network simulation function, a network simulation modeling varies according to the plurality of simulation applications 110 and 120.

Figure 2:
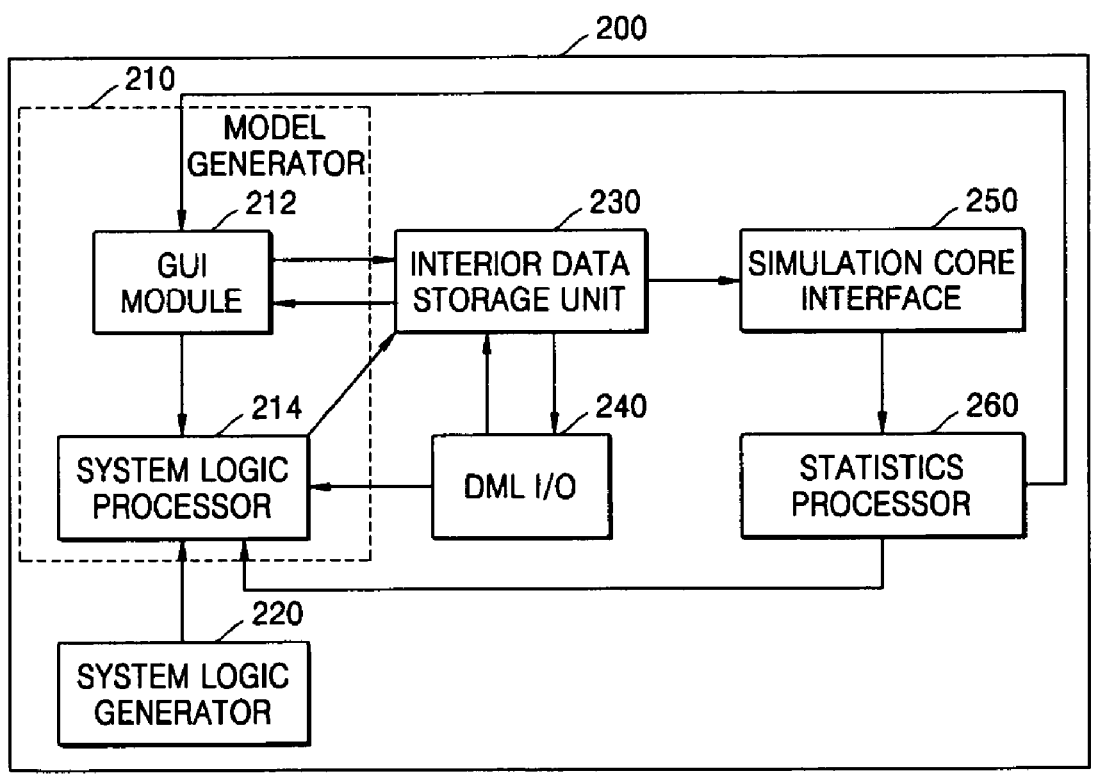
FIG. 2 is a block diagram of an apparatus for modeling and analyzing the simulation for the SSF-based network simulation package according to an embodiment of the present invention.

FIG. 2 is a block diagram of an apparatus for modeling and analyzing the simulation for the SSF-based network simulation package according to an embodiment of the present invention. Referring to FIG. 2, the apparatus for modeling and analyzing the simulation comprise a model generator 210, a system logic generator 220, an interior data storage unit 230, a domain modeling language (DML) I/O 240, a simulation core interface 250, and a statistics processor 260. The model generator 210 comprises a GUI module 212 and a system logic processor 214.

The system logic generator 220 generates various system logic sets that can be used for a specific simulation application. The system logic set is a set of rules including a) a network simulation modeling rule used to establish the configuration of network objects including a protocol, link, and node used in a specific simulation application, setting of connections between nodes, and network objects including a simulation event, algorithm, etc., establish a configuration for an effective expression of a network simulation in a GUI module, and establish a configuration for generating DML that expresses and summarizes a network simulation modeling generated using the GUI module, b) a network simulation modeling exchange rule used to apply a network simulation modeling formed using a different simulation application, and c) a simulation result and statistics calculation rule used to calculate a variety of statistics in order to effectively analyze the simulation result.

The system logic processor 214 operates the system logic set generated by the system logic generator 220 in order to analyze the network simulation modeling and simulation. Since the system logic set depends on the characteristics of a specific simulation application, the system logic set is separately generated and defined for every simulation application, and a generated and defined system logic set does not change unless the specific simulation application changes. The system logic may be configured as a kind of system head file, or a system environment definition file in an external system.

The simulation core interface 250 communicates with the simulation core 130 in the SSF-based network simulation package 100. The simulation core interface 250 may be configured as an API of the SSF-based network simulation package 100.

The interior data storage unit 230 receives attributes of network objects included in the network simulation model, generated using a variety of methods, through the GUI module 212 or the DML I/O 240, and stores attributes in a memory. The interior data storage unit 230 may be configured as a tree structure, to suit the hierarchical structure of DML.

The interior data storage unit 230 receives various statistical information generated by the statistics processor 260 through the simulation core interface 250, stores the statistical information in the memory, and responds to a statistical information request of the GUI module 212.

The GUI module 212 adds or deletes a plurality of network objects that express the network for a network simulation modeling, and provides the user with a function for editing the network simulation modeling. The GUI module 212 may be configured as a graphical editor for the user's convenience.

The GUI module 212 provides a user interface having various forms according to the characteristics of each network object used for the network simulation modeling defined in the system logic set. The GUI module 212 expresses network objects graphically so that the user can easily input and edit the attributes of network objects. The GUI module 212 supports an effective network simulation using visible analysis means for various statistical information generated by the statistics processor 260.

The DML I/O 240 creates and outputs DML that expresses and summarizes the network simulation model generated by the GUI module 212 according to the system logic set defined by the system logic generator 220. The DML I/O 240 reads and construes DML that summarizes and stores the network simulation modeling according to the system logic set, and provides a network simulation modeling.

The DML I/O 240 transfers the network simulation modeling to the interior data storage unit 230 to be stored therein, so that the user can reuse the network simulation modeling. The DML I/O 240 changes the network simulation modeling into a network simulation modeling suitable for the characteristics of a different simulation application according to the predefined system logic set, if necessary. Therefore, it is possible to reuse the network simulation modeling formed using a variety of simulation applications, and exchange the network simulation modeling between simulation applications.

The statistics processor 260 generates various statistical information with respect to the simulation result received from the simulation core interface 250 according to the predefined system logic.

The simulation result provided by the SSF-based network simulation package is based on a snapshot that records the size and volume of a packet by observing the state of a queue allocated in the network object per unit of time. Conventionally, the user must measure by hand the volume of packets generated per unit of time and the time interval of a single packet used to analyze the network simulation. Therefore, it is very difficult to analyze the network simulation.

The statistics processor 260 measures a time stamp when a single packet object moves to the network simulation model based on the intrinsic ID of each single packet object generated during the network simulation, and records the measured time stamp and attributes of single packet objects in the interior data storage unit 230. The statistics processor 260 calculates various statistical information according to the predefined system logic set based on the information recorded in the interior data storage unit 230.

The system logic processor 214 classifies and defines the system logic set generated by the system logic generator 220 according to intrinsic functions of the GUI module 212, DML I/O 240, and statistics processor 260.

The system logic processor 214 completes the network simulation modeling formed by the user in the GUI module 212 as a network simulation modeling that can be recognized by a specific simulation application according to the predefined system logic set. The system logic processor 214 receives DML created by the specific simulation application through the DML I/O 240 and creates DML as the network simulation modeling according to the system logic set defined in the system logic generator 220. The system logic processor 214 produces various statistical information according to the system logic set based on the simulation result received from the simulation core interface 250.

Figure 3B:
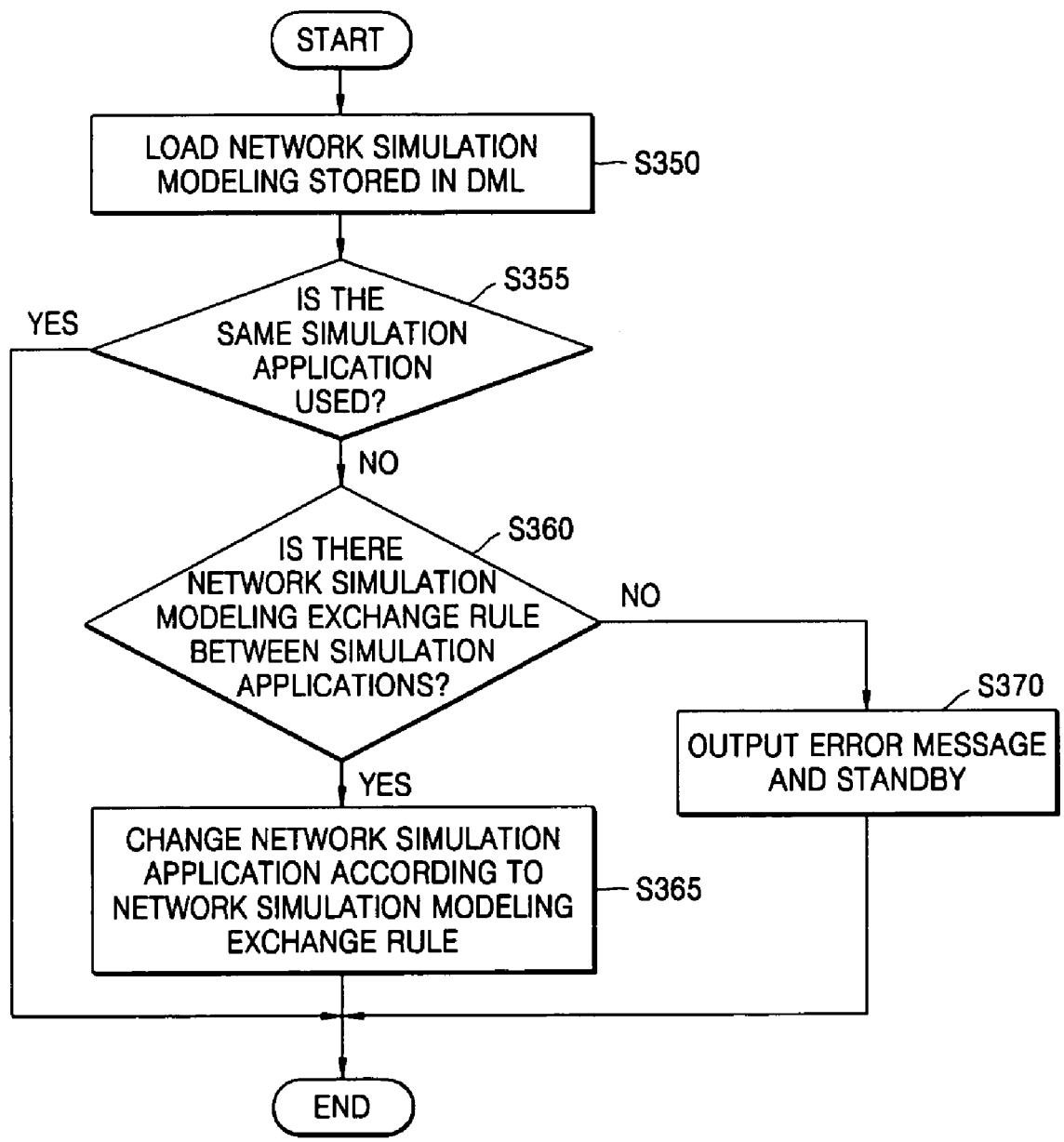

FIGS. 3A and 3B are flow charts describing a method of modeling and analyzing a network simulation according to an embodiment of the present invention. Referring to FIGS. 3A and 3B, in order to generate a network simulation model using the apparatus for modeling and analyzing the network simulation for the SSF-based network simulation package, various system logic sets are defined and generated for use in a specific simulation application (Operation S300). Since various system logic sets determine the simulation scope of a specific simulation application, and depend on the characteristics of the specific simulation application, a simulation application developer or operator may generate system logic sets rather than a general user of the SSF-based application package.

A user generates a network simulation model (Operation S305). There are two methods used to generate the network simulation model, according to whether the network simulation model will be reused.

First, the user personally adds and edits a network object in order to generate the network simulation model. That is, the user designs an initial network in a green field. Second, the user reuses an existing network simulation model stored using DML. That is, the user edits desired information from the existing network simulation model, as illustrated in FIG. 3B.

With respect to the first method, the GUI model 212 provides an environment to allow the user to input various network objects, and establish and edit attributes of each network object in order to generate the network simulation model (Operation S305).

Referring to FIG. 3B, there are two variations of the second method: one is to use a network simulation model applied to the same simulation application according to whether the same simulation application is used; and another is to reuse a network simulation model applied to a different one of the simulation applications 110 and 120.

When the model generator 210 uses the same simulation application (Operation S355), the model generator 210 reads and construes the network simulation model from a DML file, and forms a network simulation modeling (Operation S350). When the model generator 210 does not use the same simulation application (Operation S350), the model generator 210 reads and construes the network simulation model from a DML file, forms the network simulation modeling (Operation S350), and checks if a system logic set of each network object included in the network simulation modeling includes a rule of model exchange between simulation applications (Operation S360).

If the system logic set does not include the rule of model exchange (Operation S360), the model generator 210 outputs an error message to the user and stands by for a subsequent action from the user (Operation S370). If the system logic set includes the rule of model exchange (Operation S360), the model generator 210 forms a new network simulation modeling capable of being applied to simulation applications 110 and 120 according to the rule of model exchange between simulation applications predefined in the system logic set (Operation S365).

When the model generator 210 forms the network simulation modeling using the first method or the second method (Operation S305), the model generator 210 checks if the system logic set of each network object included in the network simulation model includes a network simulation modeling rule (Operation S310).

If the system logic does not include the network simulation modeling rule (Operation S310), the model generator 210 outputs an error message to the user and stands by for a subsequent action from the user (Operation S315). If the system logic includes the network simulation modeling rule (Operation S310), the model generator 210 completes the network simulation modeling capable of being applied to simulation applications 110 and 120 according to the network simulation modeling rule predefined in the system logic set (Operation S320).

After completing the network simulation modeling (Operation S320), the simulation core 130 performs a network simulation (Operation S325). Referring to FIGS. 1 and 2, the completed network simulation modeling is transferred to the SSF-based network simulation package 100 through the simulation core interface 250, and the simulation core 130 of the SSF-based network simulation package 100 performs the network simulation with respect to the network simulation modeling using simulation applications 110 and 120.

While the simulation core 130 performs the network simulation, the SSF-based network simulation package 100 obtains a variety of simulation results from simulation applications 110 and 120 according to a simulation result calculation rule predefined in the system logic set (Operation S325), and transfers the obtained simulation results to the simulation core interface 250 in order to calculate statistics that are used to effectively analyze the simulation.

The SSF-based network simulation package 100 generates a variety of simulation performance logs according to the characteristics of simulation applications 110 and 120. After completing the network simulation, the generated logs are provided to the user in order to correct various errors in the network simulation modeling. If the simulation core 130 can not complete the network simulation due to various errors in the network simulation modeling (Operation S330), the simulation core 130 outputs an error message to the user and stands by for a subsequent action from the user (Operation S315).

When the simulation core 130 completes the network simulation with respect to the network simulation modeling (Operation S330), the simulation core interface 250 calculates various statistics according to a statistics calculation rule predefined in the system logic set, based on the simulation results transferred from the SSF-based network simulation package 100 (Operation S335). The various calculated statistics are provided to the user through the GUI module 212 using a variety of methods in order to support a simulation analysis.

When the simulation result through the simulation analysis satisfies a user's request (Operation S340), the network simulation modeling is stored for future reuse (Operation S350). When the simulation result through the simulation analysis does not satisfy the user's request (Operation S340), the network simulation modeling is corrected (Operation S345).

FIG. 4 is a diagram of a system logic set used for the apparatus for modeling and analyzing the network simulation for the SSF-based network simulation package. Referring to FIG. 4, a system logic set, used for the apparatus for modeling and analyzing the network simulation for the SSF-based network simulation package, is composed of various rules that are classified as special symbols.

The system logic set expresses the characteristics of DML used for the SSF-based network simulation package. DML is expressed as a DML unit composed of a key and value pair that indicates an attribute of each network object comprising the network simulation model, in order to express and summarize the network simulation model. The key and value pair is recursively defined at the value part, which provides a hierarchical structure that expresses a sub-attribute of a network object attribute.

A key is composed of a combination of a symbol "−", integer literals from 0 to 9, and character literals. When the symbol "−" is used as a prefix, the key is a reserved word. A value is composed of a plurality of character strings comprising a pair of values starting a symbol "[" ending a symbol "]", or a character string excluding a space. A plurality of keys and values are separated by a combination of space characters, tab characters "\t", and new line characters "\n". A symbol "#" indicates comments.

Each rule for the system logic set shown in FIG. 4 forms special symbols of a single character that is not used in DML by adding the prefix or post fix to the DML unit composed of the pair of key and value in an existing DML unit, which minimizes an existing DML user's confusion, and assists the user in understanding each rule, thereby forming an effective rule.

The system logic set avoids collision with an existing DML structure that expresses the network simulation modeling, which does not require the conventional SSF-based network simulation package to be changed. The system logic according to the present invention can be applied to a variety of simulation applications suitable for different network states.

Referring to FIG. 4, an "@" 400 is used for a rule defining a position where a single DML unit that expresses the network object is placed in the network simulation model. The network simulation model of the SSF-based network simulation package has a variety of network objects, which are configured as sub-attributes of a single most significant network object. Due to the recursive DML hierarchical structure that a single network object defines a single network object value, all network objects except the most significant network object are configured as a sub-attribute of a different network object. The "@" 400, which is a post fix of the key, is used to define the path in which the network object is placed using a specific delimiter.

A "+" 401 is used for a rule that expresses attributes of a plurality of network objects and adjusts the volume of network objects. The "+" 401, which is a prefix of the key, is used to define whether the user duplicates and deletes an attribute of the network object. The attribute of the network object that includes the "+" 401 as the prefix of the key can be duplicated and deleted by the user.

The network simulation modeling rule capable of generating and expressing each network object is prepared by the apparatus for modeling and analyzing the network simulation for the SSF-based network simulation package for the network simulation modeling, and varies according to a simulation application.

A "~" 402 is used to define the validity of a specific DML unit in the network simulation modeling rule. The "~" 402, which is a post fix of the key, is used to recognize a sub-attribute of the network object as a valid network object, in order to define various patterns of sub-attributes of a single network object.

A "!" 403 and "|" 404 are used to define a sub-attribute of the network object and the scope of a value, which are necessary to define attributes of network objects in order to minimize human input error. The "!" 403 is used to define the scope of the sub-attribute of the network object. The "!" 403, which is a prefix of a key, in a plurality of network objects located in the same layer, is used to express a set of network objects as a set of sub-attributes of a higher network object. The "|" 404 is used as a delimiter of the value, so the user selects a value that is established as a plurality of item sets of the network object.

Each network object of the network simulation modeling does not necessarily require any user input, and has a specific attribute of automatically increasing value. The value is, for example, a network object identifier ID. Since the network object identifier ID is an intrinsic value of the network simulation modeling, the value is automatically incremented and provided to the user in order to minimize the user's error, and reduce repetitive operations. A "%" 405, which is a prefix of the key, describes an incrementing object, initial value, and increasing value using a specific delimiter.

A "$" 406 is used for a rule that defines the validity of a single network object. The "$" 406, which is a prefix of the key, defines whether the user excludes the network object from the network simulation modeling. The user expresses and defines characteristics of the network object using a combination of a plurality of sub-attributes of the network object.

A "<" 407 and ">" 408 are used for a rule that defines a network object attribute having the same repetitive pattern. The "<" 407 and ">" 408 always form a pair, and express the start and end of a repetitive pattern, which automatically generates a network object having the same repetitive pattern as transit node information of a path object that expresses a list of nodes in the network simulation modeling.

A "−" 409 is used to define a reserved word used by the apparatus for modeling and analyzing the network simulation for the SSF-based network simulation package. Since DML uses the "−" 409 as a prefix of the key and a token of the reserved word, the "−" 409 is suitable for a definition of the reserved word. A specific character literal having the "−" 409 as the prefix is defined as the reserved word, and each reserved word is defined as a system parameter having a intrinsic function.

The "%" 405, with the specific attribute of automatically providing a value, requires a specific system parameter that indicates the attribute which includes an identifier of a start node and destination node in the path object composed of a plurality of nodes, a node identifier of two nodes connected with a link, an identifier of each node or link comprising the link, the scope of a value of each identifier, and coordinate information used to express a network object in a GUI module. The system parameter that is defined as the reserved word substitutes for an actual value having a parameter when the network simulation model is generated and expressed.

A specific attribute which has a fixed value and is necessarily input in the simulation application must be expressed for the network simulation model but not for the user. The GUI module does not require a network object having the specific attribute. The specific attribute is referred to as a hidden attribute, which is hidden from the user when the network simulation model is generated, in order to reduce the user's confusion. A "*" 410 is a prefix of the key in a network object having the hidden attribute, which minimizes unnecessary editing and errors when the network simulation model is generated and edited.

A "xx&" 411 is used to define a rule that expresses and edits a variety of types of attributes of the network object in the GUI module. The "xx&" 411 is used to predefine various types of a window and an identifier of the window type suitable for characteristics of each network object, and is used as a prefix of the key along with the identifier of the window type of the network object. The GUI module provides the user with a window according to the identifier of the window type when the network object is expressed and edited in order to provide the user with an intuitive interface with respect to the network object. The GUI module defines a variety of expressions of each network object in order to provide the user with various screen views.

Since each network object of the network simulation modeling has a different attribute according to a simulation application, the different attribute is expressed by the GUI module and is summarized in DML to aid the user's understanding. A "/" 412 is used to define a rule that informs the user of a meaning of the key or value of each network object. The "/" 412 is used as a post fix of the key or value of the network object, and a delimiter and terminator of a two character strings.

The two character strings assist the user in understanding the meaning of the key or value of each network object attribute when the network simulation model is expressed in the GUI module. The first character string is used as a substitute for a standard expression corresponding to the key or value, and the second character string is used as an addition to the standard expression corresponding to the key or value.

For example, the first character string describes a non-canonical name of the standard expression corresponding to the key or value, and the second character string describes additional information such as the units of the value. The two character strings inform the user of the meaning of the key or value more quickly, and improve the user's understanding of the network simulation modeling.

The SSF-based network simulation package is composed of a variety of simulation applications having different characteristics. Since the variety of simulation applications have different standard expressions for a network object having the same meaning, the simulation application must be corrected and edited in order to exchange a network simulation model between simulation applications and reuse the simulation application. A "=" 413 is used to define a rule that reuses a network object having the same meaning in a different simulation application.

A network object mapping table is prepared in order to exchange the network simulation model between simulation applications, and the "=" 413 is used as a substitution operator of a set of rules comprising each network object in order to create a mapping entry with respect to various network objects and store the network object mapping table. The mapping entry is used to exchange the expression and generation rule between network objects having a different pattern, which makes it possible to exchange the network simulation modeling between simulation applications.

The network simulation using the network simulation model generated by the user is performed using the SSF-based network simulation package, and a simulation result is provided to the user. The simulation result is composed of information of packets generated per unit of time based on a system clock. A "?" 414 is used to define an analysis item and equation used to calculate a value of the analysis item, and is used as a delimiter that defines the analysis item and equation with respect to the network object. The analysis item is composed of a combination of a packet object that is generated and moves while the network simulation is performed, and a time stamp created at the moment when the packet object is generated and moves. The equation is used to calculate the analysis item, which results in calculating a variety of statistics.

In addition to the foregoing rules, more various rules are defined in order to effectively express, generate, and analyze the network simulation model. The variety of rules include a pattern rule used to express a network object in the GUI module including the color and thickness of a link, a node icon, etc., and a configuration setting rule that defines correlation of a plurality of network objects such as an interface generated when the node and link are connected.

The rules mentioned above are used to define the network simulation modeling rule, network simulation modeling exchange rule, and simulation result and statistics calculation rule in the apparatus for modeling and analyzing the network simulation for the SSF-based network simulation package, according to the intrinsic function of each rule.

The network simulation modeling rule used to form, edit, and express the network simulation model includes an environment setting rule such as a simulation option, a simulation event, etc. In the network simulation model, a configuration setting rule with respect a network element such as a node and link, a configuration setting rule with respect to a protocol and algorithm that are embedded in the network element and operated in the network simulation, and a configuration rule used to express the network simulation modeling formed of a combination of each network object generated according to the configuration setting and store the network simulation modeling in DML.

The network simulation modeling exchange rule includes a mapping rule used to exchange a set of rules according to a simulation application in order to reuse a network simulation modeling formed using a different simulation application.

The simulation result and statistics calculation rule include a configuration setting rule used to calculate a variety of statistics in order to effectively analyze the simulation result.

It is possible for the present invention to be realized on a computer-readable recording medium as a computer-readable code. Computer-readable recording media includes every kind of recording device that stores computer system-readable data. ROM, RAM, CD-ROM, magnetic tape, floppy disc, optical data storage, etc. Are used as computer-readable recording media. The computer-readable recording medium can also be realized in the form of a carrier wave (e.g., transmission through Internet). A computer-readable recording medium can be dispersed in a network-connected computer system, resulting in being stored and executed as computer-readable code by a dispersion method.

An automatic network simulation modeling using the characteristics of DML used for the SSF-based network simulation package makes it easy to form a complex network simulation modeling.

A visible analysis means is used for a network simulation result, which corrects errors in the network simulation, and reduces the need for remodeling the network simulation model based on the network simulation result.

A visible view with respect to the network simulation modeling improves the user's comprehension of the network simulation model.

An SSF-based network simulation package reduces the opportunity for human error in the network simulation modeling.

The network simulation modeling is suitable for a variety of simulation applications and provides a general-purpose function of the network simulation modeling that does not belong to a specific simulation application.

The network simulation modeling is stored in DML and reused, to improve a network simulation model, and is used as input data for a different kind of instrument using DML or a different simulation application in the SSF-based network simulation package.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. An apparatus for modeling and analyzing a network simulation for a network simulation package, comprising:
    a system logic generator which generates a system logic set including a network simulation modeling rule and a simulation statistics calculation rule;
    a model generator which forms the network simulation modeling suitable for a predetermined simulation application according to the network simulation modeling rule of the system logic set;
    a domain modeling language (DML) I/O which creates a DML that summarizes and expresses each attribute of network objects included in the network simulation modeling according to the system logic set;
    a simulation core interface which transmits the network simulation modeling to a predetermined network simulation package, and receives a result obtained after the network simulation modeling is performed; and
    a statistics processor which generates statistical information from the result received from the simulation core interface according to the simulation statistics calculation rule of the system logic set.

2. The apparatus according to claim 1, further comprising:
    an interior data storage unit which stores each attribute of network objects included in the network simulation modeling; and
    the domain modeling language (DML) I/O which transmits the DML to the interior data storage unit, and reads and construes each attribute of network objects stored in the interior data storage unit, and outputs a network simulation modeling.

3. The apparatus according to claim 2, wherein:
    the system logic generator generates the system logic set including a network simulation modeling exchange rule; and
    the model generator changes the network simulation package received from the DML I/O suitable for the predetermined network application according to the network simulation modeling exchange rule of the system logic set.

4. The apparatus according to claim 1, wherein the model generator comprises:
    a GUI module which receives an input predetermined network simulation modeling from a user; and
    a system logic processor which completes the input predetermined network simulation modeling suitable for the predetermined network application according to the network simulation modeling rule of the system logic set.

5. The apparatus according to claim 1, wherein the system logic generator generates the system logic set that defines a predetermined rule by adding a special symbol composed of a single character to a DML unit as a prefix or post fix.

6. The apparatus according to claim 1 or claim 5, wherein the system logic generator generates the system logic set that defines and includes one or more rules among a first rule to define the path in which each network object is placed in the network simulation modeling; a second rule to define a network object capable of being added to or deleted from the network simulation modeling; a third rule to define the validity of a predetermined DML standard expression with respect to the network object; a fourth rule to define a lower attribute of the network object and the scope of a value; a fifth rule to define an initial value and increment of an incrementing attribute of the network object; a sixth value to define whether to include a single network object in the network simulation modeling; a seventh rule to define a network object having a repetitive pattern; an eighth rule to define a system parameter having an intrinsic value provided by a system; a ninth rule to define a hidden attribute that allows a predetermined attribute of the network object to be hidden from the user; a tenth rule to define a window type suitable for the attribute of the network object; an eleventh rule to define an expression that can be substituted for and added to the DML standard expression as a different character string; a twelfth rule to define the necessary change of a network object generation rule in order to exchange the network simulation modeling; and a thirteenth rule to define various statistics in order to analyze a network simulation result.

7. A method of modeling and analyzing a network simulation for a network simulation package, comprising:
    generating a system logic set including a network simulation modeling rule, a network simulation modeling exchange rule, and simulation statistics calculation rule;
    forming the network simulation modeling suitable for a predetermined simulation application according to the network simulation modeling rule of the system logic;
    creating a domain modeling language (DML) to summarize and express each attribute of network objects included in the network simulation modeling according to the system logic set;
    transmitting the network simulation modeling to a predetermined network simulation package, and receiving the result of the network simulation modeling from the predetermined network simulation package; and
    generating statistical information from the result received from the network simulation package according to the simulation statistics calculation rule of the system logic set.

8. The method according to claim 7, wherein forming the network simulation modeling comprises:

reading and construing each attribute of network objects stored in a predetermined storage unit according to the system logic set, to form the network simulation modeling; and changing the network simulation modeling suitable for the predetermined network application according to the network simulation modeling exchange rule of the system logic set.

9. The method according to claim 7, wherein forming the network simulation modeling comprises:

receiving an input predetermined network simulation modeling from a user; and completing the input predetermined network simulation modeling suitable for the predetermined network application according to the network simulation modeling rule of the system logic set.

10. The method according to claim 7, further comprising:

generating the system logic set that defines a predetermined rule by adding a special symbol composed of a single character to a DML unit as a prefix or post fix.

11. The method according to claim 7 or claim 10, further comprising:

generating the system logic set that defines and includes one or more rules among a first rule to define the path in which each network object is placed in the network simulation modeling; a second rule to define a network object capable of being added to or deleted from the network simulation modeling; a third rule to define the validity of a predetermined DML standard expression with respect to the network object; a fourth rule to define a lower attribute of the network object and the scope of a value; a fifth rule to define an initial value and increment of an incrementing attribute of the network object; a sixth value to define whether to include a single network object in the network simulation modeling; a seventh rule to define a network object having a repetitive pattern; an eighth rule to define a system parameter having an intrinsic value provided by a system; a ninth rule to define a hidden attribute that allows a predetermined attribute of the network object to be hidden from the user; a tenth rule to define a window type suitable for the attribute of the network object; an eleventh rule to define an expression that can be substituted for and added to the DML standard expression as a different character string; a twelfth rule to define the necessary change of a network object generation rule in order to exchange the network simulation modeling; and a thirteenth rule to define various statistics in order to analyze a network simulation result.

12. A computer readable program having embodied thereon a computer program for executing the network simulation modeling and method of claim 7.

* * * * *